US009652456B2

(12) United States Patent
Hartshorn et al.

(10) Patent No.: US 9,652,456 B2
(45) Date of Patent: May 16, 2017

(54) AUTOMATED RELATIONSHIP MANAGEMENT FOR DARWIN INFORMATION TYPING ARCHITECTURE

(75) Inventors: Ian Martin Hartshorn, Toronto (CA); Benjamin Jason Silzer, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1385 days.

(21) Appl. No.: 12/110,018

(22) Filed: Apr. 25, 2008

(65) Prior Publication Data

US 2009/0271711 A1    Oct. 29, 2009

(51) Int. Cl.
  *G06F 3/048*    (2013.01)
  *G06F 17/30*    (2006.01)
  *G06F 17/22*    (2006.01)
  *G06F 17/24*    (2006.01)

(52) U.S. Cl.
  CPC .... *G06F 17/30014* (2013.01); *G06F 17/2235* (2013.01); *G06F 17/2247* (2013.01); *G06F 17/24* (2013.01)

(58) Field of Classification Search
  CPC ........... G06F 17/2235; G06F 17/30014; G06F 17/24; G06F 17/2247
  USPC ........................................................ 715/853
  See application file for complete search history.

(56) References Cited

U.S. PATENT DOCUMENTS 6,189,012 B1    2/2001 Mital et al.
6,411,924 B1 *  6/2002 de Hita et al. .................... 704/9
7,418,452 B2 *  8/2008 Maze
7,480,669 B2 *  1/2009 Lo et al.
2007/0124281 A1  5/2007 Cowan
2007/0136400 A1 * 6/2007 Ames et al. ................ 707/205
2009/0031239 A1 * 1/2009 Coleran et al. ............ 715/771

OTHER PUBLICATIONS

Binder, Zak, "Improving Relationships in Relationship Tables," Feb. 19, 2008, OASIS, Available https://web.archive.org/web/20080219145324/http://dita.xml.org/improving-relationships-relationship-tables.*
PTC, "PTC Arbortext Solution for DITA," 2006, pp. 1-2.*
PTC, "DITA—Four Letters You Need to Know," 2006, pp. 1-12.*

(Continued)

*Primary Examiner* — Alvin Tan
(74) *Attorney, Agent, or Firm* — Steven M. Greenberg, Esq.; CRGO Law

(57) ABSTRACT

Embodiments of the present invention address deficiencies of the art in respect to relationship management in information architectures and provide a novel and non-obvious method, computer system and computer program product for managing links in a Darwin Information Typing Architecture (DITA). In one embodiment of the invention, a method for managing DITA links can include reading an information unit file comprising a plurality of topics and reading a relationship management file corresponding to the information unit file, wherein the relationship management file comprises at least one link corresponding to at least one of the plurality of topics, wherein a link comprises a reference to or from a second topic. The method can further include displaying in a graphical user interface the plurality of topics and displaying in the graphical user interface a description of each link corresponding to the plurality of topics.

20 Claims, 2 Drawing Sheets

(56) References Cited

OTHER PUBLICATIONS

OASIS, "OASIS DITA Language Specification v1.0" May 9, 2005, OASIS Open 2005, Available https://docs.oasis-open.org/dita/v1.0/langspec/xref.html.*

DITA Open Toolkit 1.3.1, "DITA Open Toolkit User Guide," Apr. 18, 2007, VR Communications, Third Edition, Available http://dita-ot.sourceforge.net/doc/ot-userguide131/xhtml/.*

* cited by examiner

AUTOMATED RELATIONSHIP MANAGEMENT FOR DARWIN INFORMATION TYPING ARCHITECTURE

BACKGROUND OF THE INVENTION

Field of the Invention

The present invention relates to information architectures, and more particularly to improved methods for managing relationships in information architectures.

Description of the Related Art

The Darwin Information Typing Architecture (DITA) is an XML-based topic-centric information architecture for authoring, producing, and delivering technical information. DITA divides content into small, self-contained topics that can be reused in different deliverables. The extensibility of DITA permits organizations to define specific information structures and still use standard tools to work with them. The ability to define company-specific and even group-specific information architectures enables DITA to support content reuse and reduce information redundancy.

One of DITA's strengths is that links between topics are most often controlled by files outside the content itself. In HTML, for example, a link from file A to file B must be contained inside file A itself. In DITA, this link can be contained inside a separate file, such as file C. Thus, the related linking structure can be stored, reviewed, and maintained in a single file or small set of files, called DITA maps. The links in these outside files, or DITA maps, can be considered to fall into two main types. The first type of link is a hierarchical link that is derived primarily from the navigation structure created inside a DITA map, and flows from a parent-child or sibling relationship between topics. The second type of link is a relationship link that is derived from relationship tables, which describe link relationships between topics.

To create a link between two or more topics using a relationship table, a table is created and topic references are inserted into the cells of the table. Links are created between any two topics in the same row, but in different cells of that row. Links can be specified as being unidirectional or bidirectional. It is also possible to specify "peer" links, or links to topics that are external to the current file.

In practice, the use of relationship tables during the authoring of information can be tedious and time-consuming. For example, if a link in a topic must be removed, an author must search through multiple rows of table data to locate and correct the link. When large numbers of topics and sizable relationship tables are present, this can be a mammoth task. Further, the native state of a relationship table does not allow for the easy viewing of all links to and from a topic—an author must initiate additional processing steps to see such information. The additional processing necessary to view the information required by an author reduces the ability of the author to manage the relationships between topics as represented by links.

Therefore, there is a need to overcome the shortcomings of the prior art and more particularly for a more efficient way of managing relationships in the Darwin Information Typing Architecture.

BRIEF SUMMARY OF THE INVENTION

Embodiments of the present invention address deficiencies of the art in respect to relationship management in information architectures and provide a novel and non-obvious method, computer system and computer program product for managing links in a Darwin Information Typing Architecture (DITA). In one embodiment of the invention, a method for managing DITA links can include reading an information unit file comprising a plurality of topics and reading a relationship management file corresponding to the information unit file, wherein the relationship management file comprises at least one link corresponding to at least one of the plurality of topics, wherein a link comprises a reference to or from a second topic. The method can further include displaying in a graphical user interface the plurality of topics and displaying in the graphical user interface a description of each link corresponding to the plurality of topics.

In another embodiment of the invention, a computer program product comprising a computer usable medium embodying computer usable program code for managing links in a Darwin Information Typing Architecture (DITA) is provided. The computer program product includes computer usable program code for reading an information unit file comprising a plurality of topics and reading a relationship management file corresponding to the information unit file, wherein the relationship management file comprises at least one link corresponding to at least one of the plurality of topics, wherein a link comprises a reference to or from a second topic. The computer program product further includes computer usable program code for displaying in a graphical user interface the plurality of topics and displaying in the graphical user interface a description of each link corresponding to the plurality of topics.

In another embodiment of the invention, a computer system for managing links in a Darwin Information Typing Architecture (DITA) is provided. The computer system includes a memory for storing an information unit file comprising a plurality of topics and a relationship management file corresponding to the information unit file, wherein the relationship management file comprises at least one link corresponding to at least one of the plurality of topics, wherein a link comprises a reference to or from a second topic. The computer system further includes a processor configured for reading the information unit file and the relationship management file and a display for displaying in a graphical user interface the plurality of topics and a description of each link corresponding to the plurality of topics.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, computer program product and computer system for managing links in the Darwin Information Typing Architecture (DITA). The present invention allows a user to quickly and easily see the relationships that exist between topics in a DITA document via the use of a graphical user interface that graphically displays the links between topics, as stored in a relationship table, such as a DITA map. Besides facilitating the viewing of link relationships between topics, the present invention allows a user to rapidly modify links by interacting with the graphical user interface using standard conventions for graphical user interface interaction, such as drag-and-drop and mouse-button clicking. Further, the present invention allows a user to create and delete links in a relationship table in a fast and straightforward manner using the graphical user interface.

Figure 1:
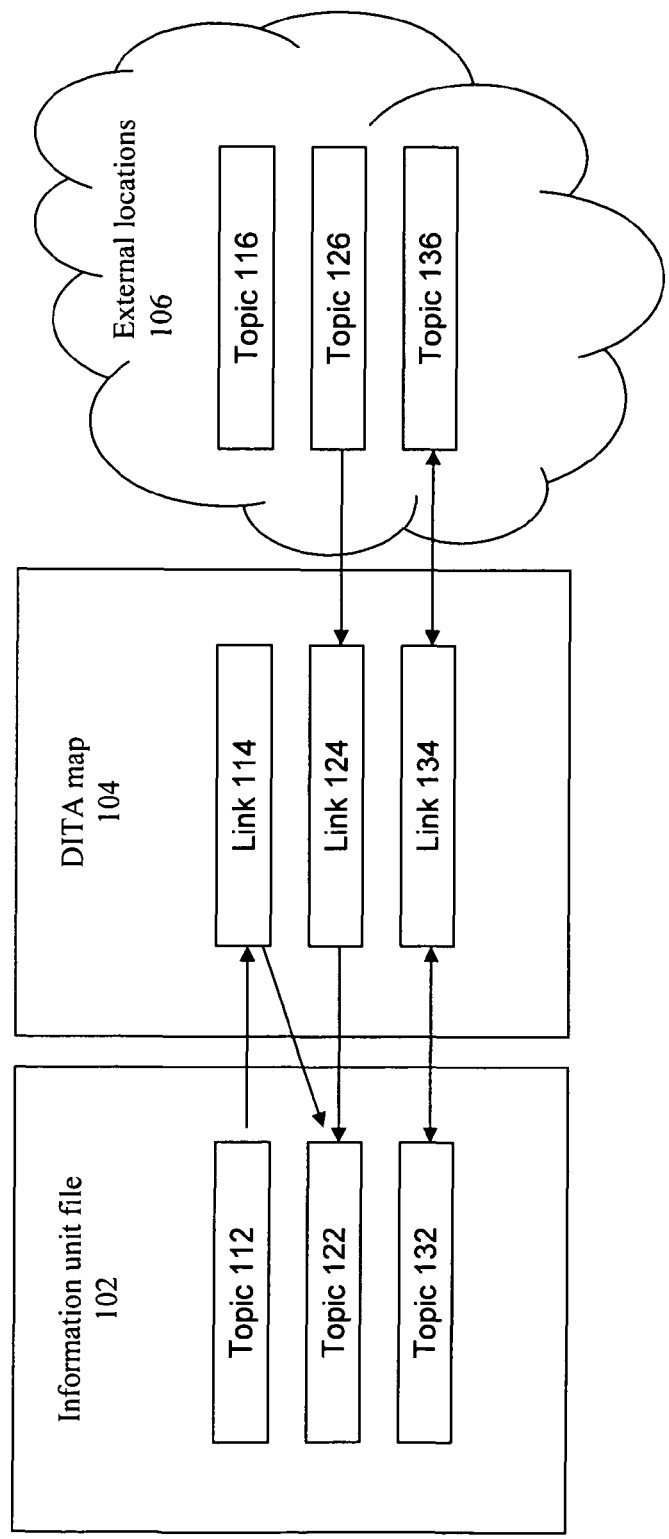
FIG. 1 is a block diagram illustrating linking structures in the Darwin Information Typing Architecture (DITA)

FIG. 1 is a block diagram illustrating linking structures using DITA. FIG. 1 shows a first information unit file 102, wherein an information unit can be a single computer file, a plurality of computer files, a set of stored data or any other collection of data that belongs together for classification or categorical purposes. In one example, an information unit can be a single subject or a single topic of discussion. FIG. 1 further shows a cloud 106 representing any location external to the first information unit file 102, including another information unit file. The external locations 106 are associated with the first information unit file 102 via links or references in the relationship management file 104, which may be a DITA map including a relationship table.

The first information unit file 102 can be a text file including ASCII characters. The first information unit file 102 includes a list of topics 112, 122 and 132. The external locations 106 include a list of topics 116, 126 and 136. An example of a topic in a text file version of an information unit file is provided below:

```
<concept id="simpleconcept">
  <title>The DITA concept topic</title>
  <shortdesc>This type of topic provides background.</shortdesc>
  <conbody>
  A concept topic has a title, a short description, and a descriptive body.
  </conbody> </concept>
```

The relationship management file 104 can be a text file including ASCII characters. The relationship management file 104 includes links 114, 124 and 134 and may be a DITA map including a relationship table. A DITA map organizes topics into hierarchies, tables, and groups, and have links that reference other DITA maps. Basic elements of a DITA map are "topicref" elements. A topicref can point to a DITA topic, map, or to any other resource that can be processed or linked to. Relationship tables are defined in a DITA map with the "reltable" element. Relationship tables can be used to define relationships among the topics in different cells of the same row. In a relationship table, the columns may define common attributes or metadata for the topics in that column. The rows define relationships, with each cell representing a different role in the relationship. For example, a table with different columns for concepts, tasks, and reference topics could be used to define the relationship between a task and the topics that support it.

An example of a relationship table in a text file version of a DITA map is provided below:

```
<reltable>
  <relheader>
    <relcolspec type="concept"/>
    <relcolspec type="task"/>
    <relcolspec type="reference"/>
  </relheader>
  <relrow>
    <relcell>
      <topicref href="A.dita"/>
    </relcell>
    <relcell>
      <topicref href="B.dita"/>
    </relcell>
    <relcell>
      <topicref href="C1.dita"/>
      <topicref href="C2.dita"/>
    </relcell>
  </relrow>
</reltable>
```

With regard to links 114, 124 and 134 in DITA map 104, various types of links are available. Link 114 provides a unidirectional link from topic 112 in information unit file 102 to topic 122 in information unit file 102. Link 124 provides a unidirectional link from topic 126 in external location 106 to topic 122 in information unit file 102. Link 134 provides a bidirectional link from topic 132 in information unit file 102 to topic 136 in external location 106.

As explained above, various types of links may be available in DITA map 104. One example of a type link is a link wherein the source is located inside information unit file 102 and the target is located in an external location 160, such as in link 124. A second example of a type of link is a link where the source and the target are located inside information unit file 102. In this second example, the link may be a reciprocal link. Alternatively, the first topic may link to the second topic, but the second topic may link to another topic. In this alternative, the first topic may be designated as only a source topic that does not allow the first topic to be a target topic. Also in this alternative, the second topic may be a designated as a only a target topic that does not allow for the second topic to be a source topic.

In an embodiment where the source and the target of a link are located inside information unit file 102, the default link text may be taken from the title tags of the two topics. The default link text may be manually overwritten using the attributes of the topic references that appear in the relationship table. To illustrate, the following markup language is a link from "topic A" to "topic B," with the link text from the link from A to B overwritten by the combination of the "navtitle" and "loctitle" tagging.

```
<reltable>
<relrow>
<relcell>
<topicref href="a.dita" navtitle="Title A" type="topic"></topicref>
</relcell>
<relcell>
<topicref href="b.dita" locktitle="yes" navtitle="OVERRIDE - Title B" type="topic">
</topicref>
</relcell>
</relrow>
</reltable>
```

Figure 2:
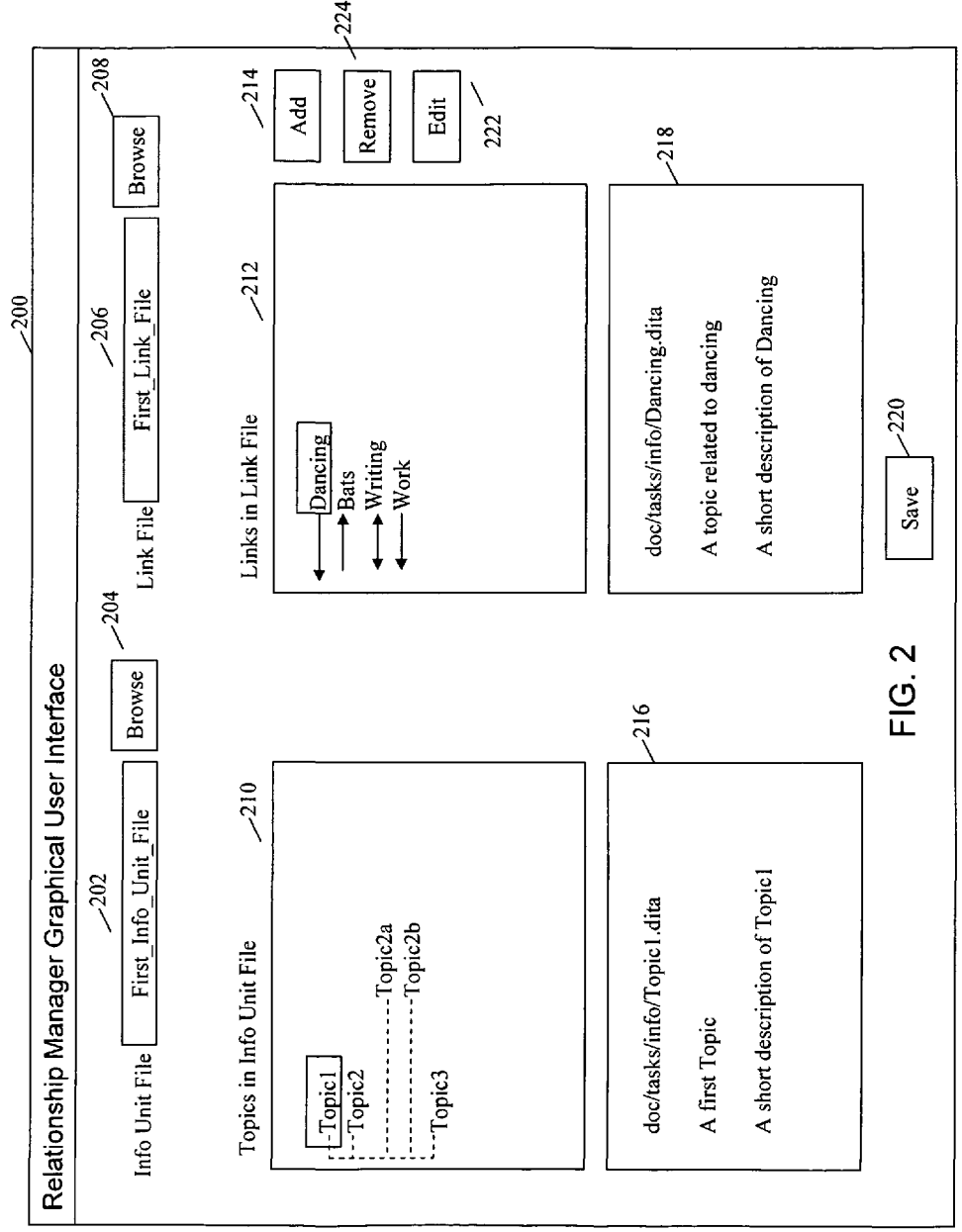
FIG. 2 is an illustration of a graphical user interface for managing DITA links, according to one embodiment of the present invention.

FIG. 2 is an illustration of a graphical user interface 200 for managing DITA links, according to one embodiment of the present invention. The graphical user interface 200 may be executed as a client application by a computer of a user or be executed as a remote application executed on a server via a network. A user may interact with the graphical user interface 200 using standard conventions for graphical user interface interaction, such as drag-and-drop and mouse-button clicking.

Graphical user interface 200 allows a user to select an information unit via text field 202, wherein the browse button 204 is used to spawn a separate file-selection window for selecting a file while browsing folders. Once an information unit (comprising one or more file) is selected, the program executing the graphical user interface 200 reads the information unit file or files and the corresponding full path(s) and/or file name(s) is/are displayed in the text field 202.

Text field 210 graphically displays all topics included in the selected information unit file. Note that for each topic, a title of the topic is displayed. Also, in instances where a hierarchy exists within topics, a graphic indicator of hierarchy of the topics is displayed in text field 210 such that a second topic that is below a first topic in the hierarchy is displayed underneath the first topic in an indented manner.

Note that the user may select a topic by clicking on a topic in text field 210 such that the selected topic is highlighted, as FIG. 2 shows that "Topic 1" is highlighted. Text field 216 displays the full path of the location of the selected topic, a short description of the selected topic and a title of the selected topic.

Graphical user interface 200 allows a user to select a relationship management file, e.g., a DITA map with a relationship management file, via text field 206, wherein the browse button 208 is used to spawn a separate file-selection window for selecting a file while browsing folders. Once a relationship management file is selected, the program executing the graphical user interface 200 reads the relationship management file and its full path and/or file name is displayed in the text field 206.

Text field 212 graphically displays all links included in the selected relationship management file for the topic selected in text field 210. The present invention accomplishes this step by identifying each link of the selected relationship management file that references the topic selected in the text field 210 and displaying information for each of the identified links. Note that for each identified link, a title of the topic referenced by the link is displayed. Also, for each identified link a graphic indicator of direction (e.g., unidirectional or bidirectional) is displayed in text field 212 such that an arrow or arrows denotes in which direction the link points, whether the link is bidirectional or whether the link is a "peer link."

Note that the user may select a link by clicking on a link in text field 212 such that the selected link is highlighted, as FIG. 2 shows that the "Dancing" link is highlighted. Text field 218 displays the full path of the location of the topic referenced by the selected link, a short description of the topic referenced by the selected link and a title of the topic referenced by the selected link.

Using graphical user interface 200, the user may perform various activities for managing the links in the selected relationship management file. The user may, for example, remove a link in a relationship management file by selecting the link in the text field 212 and clicking the "remove" button 224, resulting in the selected link being removed from the corresponding relationship management file.

The user may further add a link to a relationship management file. The user may click the Add button 214, which spawns a separate window wherein the user may specify the type of link, the name of the link, the direction of the link, the topics to which the link refers and other identifying information for a link. In another alternative, the user may drag and drop a link from another interface, from the user's desktop or from another program into the text field 212 of interface 200.

The present invention accomplishes the task of adding a link to the selected relationship management file by iterating through each topic of the selected information unit file in the relationship table of the selected relationship management file and adding a corresponding reference to the appropriate cell of the relationship table.

In one embodiment of the present invention, the task of adding a link to the selected relationship management file is performing via the execution of a sequence of steps. This sequence starts by identifying a relative path between the source file (or topic) and the new file (topic). Next, the relative path is checked against the topics that have been identified as making up the information unit file. If the path matches one of the paths in the information unit file, it is determined whether the new topic of the new link is inside or outside the information unit file. If the new topic of the new link is outside the information unit file, then the new link is deemed a peer link and a unidirectional link is created from the source to the target topic. The user may then enter the link text to be used and the user may be provided the option of specifying the link as being external instead of peer. If the new topic of the new link is inside the information unit file, then a reciprocal link is created from the source to the target topic and the user is provided with the option of changing the direction attribute of the link.

In one embodiment of the present invention, the user may add a link to a new topic is located not only externally to the information unit file, but also externally to the user's computer or machine. In a further embodiment, a user may add a link that specifies a URL with an external link, or a link that specifies an external or remote location. In this case, a unidirectional link marked external would be created.

In an embodiment of the present invention, the program of the interface 200 determines whether a link defined by a user to be added to a relationship management file is a "peer" link. The program of the interface 200 makes this determination by accessing the topic referenced by the link defined by the user and determining whether the referenced topic is local to the current information unit file. If the link defined by the user references a local topic, then a bidirectional link is created. If the link defined by the user references an external or non-local topic, then a unidirectional "peer" link is created.

The user may further edit a link in a DITA map or link file. The user may click the Edit button 222, which spawns a separate window wherein the user may edit data identifying the link, such as the type of link, the name of the link, the direction of the link, the topics to which the link refers and other identifying information of a link. Another example of an attribute that may describe a link includes a "navtitle" attribute for peer and external links, which defines a value that may be the text used for the hyperlink. Another example of an attribute that may describe a link includes an "href" attribute that defines the relative path from the source topic to the target topic. Yet another example of an attribute that may describe a link includes a "format" attribute that defines a file format such as ".dita," ".html," ".pdf," ".txt," etc. Yet another example of an attribute that may describe a link includes a "platform" that is used to control whether or not a link will instantiate when output is created. For example, a link may appear only when documents for a UNIX operating system is created. Other example of attributes that may describe a link include "product," "audience" and "otherprops" attributes that describe characteristics similar to the "platform" attribute.

Once the user has made all changes or modifications in graphical user interface 200, the user may press the "save" button 220 so as to save all changes made.

In an embodiment of the present invention, upon pressing of the "Save" button 220, a relationship table may be generated as follows. All "peer" links from topics in the selected information unit file are placed in a two-column relationship table, wherein the left column contains source for topics within the selected information unit file and the right column contains source for the target of the "peer" link. All links between topics of the same type (concept, task, reference, general/other) are placed into a two-column relationship table wherein one row is created for each relationship. There may be one table generated per topic type.

All links between tasks and other local topics in the selected information unit file are recorded in a standard three-column table (maybe 4 if there are topics that aren't task, concept, or reference-mappable) wherein a minimum of one row per task is generated. In the first row is included all links between the task that involve the task having a link-text override. In the second row is included all links between the task and concept topics, In the third row is included all links between the task and reference topics. If a fourth row is used for topics that aren't task, concept, or reference-mappable, then the fourth row includes all links between the task and topics of other types.

Each link between a concept and other local non-tasks are recorded in a three column table. The first row includes all links between the concept and reference/others that require the concept to have a linktext override. The second row includes all links between concept and reference topics and the third row includes all links between concept and other types of topic.

Each link between a reference topic and another topic type (not concept or task) is recorded in a two row table. The first row includes all links between references and "other" types that require the reference topic to use a linktext override. The second row includes all links between references and "other" topics.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for managing links in a Darwin Information Typing Architecture (DITA), comprising:
    selecting in a graphical user interface an information unit file comprising a plurality of topics;
    displaying in the graphical user interface the plurality of topics included in the selected information unit file;
    selecting a topic from the plurality of topics;
    selecting in the graphical user interface a relationship management file comprising a DITA map comprising a relationship table comprising a multiplicity of links each of the links relating one of the topics in the selected information unit file to another of the topics in the selected information unit file;
    displaying in the graphical user interface all links included in the selected relationship management file for the selected topic, wherein each link comprises a reference to and/or from a second topic; and
    adding a link to the relationship management file by iterating through each topic of the selected information unit file in the relationship table of the selected relationship management file and adding a corresponding reference to an appropriate cell of the relationship table.

2. The method of claim 1, further comprising:
    displaying for the information unit file at least one of: a full path, a title and a description.

3. The method of claim 1, further comprising:
    displaying for the relationship management file at least one of: a full path, a title and a description.

4. The method of claim 1, wherein displaying the plurality of topics comprises:
    displaying a title for each of the plurality of topics.

5. The method of claim 1, wherein displaying the links comprises:
    displaying for each of the links corresponding to the selected topic a title of a second topic referenced by the link and a graphic indicating whether the link extends to and/or from the second topic.

6. The method of claim 1, further comprising:
    upon selecting a link, displaying at least one of a full path and a description of a second topic referenced by the link.

7. The method of claim 1, further comprising:
    receiving user input indicating the removal of a link; and
    modifying the relationship management file to remove the link.

8. A computer program product comprising a non-transitory computer usable storage medium having stored thereon computer usable program code for managing links in a Darwin Information Typing Architecture (DITA), the computer usable program code, when executed by a machine, causes the machine to perform:

selecting in a graphical user interface an information unit file comprising a plurality of topics;

displaying in the graphical user interface the plurality of topics included in the selected information unit file;

selecting a topic from the plurality of topics;

selecting in the graphical user interface a relationship management file comprising a DITA map comprising a relationship table comprising a multiplicity of links each of the links relating one of the topics in the selected information unit file to another of the topics in the selected information unit file;

displaying in the graphical user interface all links included in the selected relationship management file for the selected topic, wherein each link comprises a reference to and/or from a second topic; and adding a link to the relationship management file by iterating through each topic of the selected information unit file in the relationship table of the selected relationship management file and adding a corresponding reference to an appropriate cell of the relationship table.

9. The computer program product of claim 8, further comprising:

displaying for the information unit file at least one of: a full path, a title and a description.

10. The computer program product of claim 8, further comprising:

displaying for the relationship management file at least one of: a full path, a title and a description.

11. The computer program product of claim 8, wherein displaying the plurality of topics comprises:

displaying in the graphical user interface a title for each of the plurality of topics.

12. The computer program product of claim 8, wherein displaying the links comprises:

displaying for each of the links corresponding to the selected topic a title of a second topic referenced by the link and a graphic indicating whether the link extends to and/or from the second topic.

13. The computer program product of claim 8, further comprising:

upon selecting a link, displaying at least one of a full path and a description of a second topic referenced by the link.

14. The computer program product of claim 8, further comprising:

receiving user input indicating the removal of a link; and modifying the relationship management file to remove the link.

15. A computer system for managing links in a Darwin Information Typing Architecture (DITA), comprising:

a processor configured for selecting in a graphical user interface an information unit file comprising a plurality of topics;

displaying in the graphical user interface the plurality of topics included in the selected information unit file;

selecting a topic from the plurality of topics;

selecting in the graphical user interface a relationship management file comprising a DITA map comprising a relationship table comprising a multiplicity of links each of the links relating one of the topics in the selected information unit file to another of the topics in the selected information unit file;

displaying in the graphical user interface all links included in the selected relationship management file for the selected topic, wherein each link comprises a reference to and/or from a second topic; and adding a link to the relationship management file by iterating through each topic of the selected information unit file in the relationship table of the selected relationship management file and adding a corresponding reference to an appropriate cell of the relationship table.

16. The computer system of claim 15, wherein the graphical user interface displays at least one of a full path, a title and a description for the information unit file.

17. The computer system of claim 15, wherein the graphical user interface displays at least one of a full path, a title and a description for the relationship management file.

18. The computer system of claim 15, wherein the graphical user interface displays a title for each of the plurality of topics.

19. The computer system of claim 15, wherein the graphical user interface displays, for each of the links corresponding to the selected topic, a title of a second topic referenced by the link and a graphic indicating whether the link extends to and/or from the second topic.

20. The computer system of claim 15, wherein the graphical user interface displays, upon selecting a link at least one of a full path and a description of a second topic referenced by the link.

\* \* \* \* \*